United States Patent [19]

Middel et al.

[11] 4,441,935
[45] Apr. 10, 1984

[54] APPARATUS AND METHOD FOR SCARFING

[75] Inventors: Jan Middel, Barsingerhorn; Gezinus A. Steenkamp, Heemskerk, both of Netherlands

[73] Assignee: Estel Hoogovens B.V., Netherlands

[21] Appl. No.: 413,257

[22] Filed: Aug. 31, 1982

[30] Foreign Application Priority Data

Sep. 11, 1981 [NL] Netherlands .......................... 8104203

[51] Int. Cl.³ ................................................ B23K 7/06
[52] U.S. Cl. ........................................ 148/9.5; 266/51; 266/53
[58] Field of Search ....................... 266/51, 53; 148/9.5

[56] References Cited

U.S. PATENT DOCUMENTS

| | | | |
|---|---|---|---|
| 3,469,830 | 9/1969 | Leyque et al. | 266/53 |
| 3,544,095 | 12/1970 | Thalhammer | 266/53 |
| 3,932,199 | 1/1976 | Lucht et al. | 266/51 |

*Primary Examiner*—W. Stallard
*Attorney, Agent, or Firm*—Stevens, Davis, Miller & Mosher

[57] ABSTRACT

An inspection track is scarfed by moving a burner across a flat surface of a steel slab, particularly a slab of ductile steel of deep-drawing quality, to enable sub-surface inspection of the slab. To achieve accurate control of the depth of the track, the burner is mounted on a burner carriage having at least one skid surface which contacts the slab surface of the slab at an unscarfed region thereof. A guide track is spaced from the slab surface and the carriage is moved with said skid making sliding contact with the slab surface while guided by said guide track. The skid surface makes substantial contact pressure with the slab surface so that scale on the slab surface is pushed aside and/or crushed by the skid surface, whereby the burner is maintained at a substantially constant distance from the slab surface.

10 Claims, 5 Drawing Figures

APPARATUS AND METHOD FOR SCARFING

BACKGROUND OF THE INVENTION

1. Field of the Invention

The invention relates to apparatus for scarfing, more particularly for scarfing an inspection track on a flat surface of a steel slab, particularly a slab of ductile steel of deep drawing quality, to enable inspection of the slab. The invention also relates to a method of scarfing.

2. Description of the Prior Art

Scarfing processes are carried out on steel for three distinct reasons. The first is to remove flaws such as cracks in a piece of steel, e.g. a slab. This is carried out by means of a hand-held flame torch, which is used to burn away the metal entirely in order to remove the flaw. The operator applies the torch and moves it according to the nature of the flaw being removed. Secondly, scarfing is used to remove a complete surface layer of the steel, particularly with a view to removing any flaws which may be present at the surface. One apparatus designed for carrying out this second process is described in GB 847,993, in this case, the entire surface of a steel bar is removed by passing the bar through a scarfing apparatus which provides an annular inwardly directed flame. The bar is moved past the apparatus. Guide means for inserting the bar are provided, and also for guiding the bar after the burned-away surface portion has been removed.

The third purpose for which scarfing is used is to inspect the quality of a steel slab. When a slab is rolled into sheet, flaws which may not be visible on the surface of the slab are revealed in the sheet. It is therefore desirable to estimate the number of such subsurface flaws in the slab, before it is rolled. This may be done, as described in more detail below, by scarfing an inspection track on the slab.

Although the apparatus according to the invention might be applied to the removal of flaws, it is particularly designed and intended for quality inspection of a steel slab. The invention will be explained here in relation to this purpose.

A criterion for the quality of a slab of steel which is to be rolled is thus the number and type of defects which lie 1 to 3 mm deep under the surface of the slab. These defects, which are formed by inclusions of $Al_2O_3$ and $SiO_2$ and, in the case of continuously cast slab, also by residual casting powder, come to the surface during the further working of the slab due to oxidation of the sheet surface during heating in a furnace and hot-rolling. The oxidized surface layer falls off exposing the steel beneath. They determine the quality of the surface in the finished product. This surface quality is in many cases of great importance, for instance in the case of car bodywork.

A known method for judging the quality of a slab of rolled steel consists of scarfing an inspection channel on the slab surface using a hand-held blow-torch, the channel having a depth equal to the thickness of the layer which will subsequently be lost by oxidation. The number and type of defects in the inspection channel can then be ascertained. By inspection channel (or track) we mean here a channel obtained by scarfing over a width of e.g. about 10 cm for at least a part of the length of the slab parallel to its longitudinal direction.

A problem in this conventional method of scarfing an inspection track by hand is that accuracy of the estimation of quality is dependent on the competence of the operator in forming an uninterrupted channel of constant depth with a blow-torch. The channel tends to be irregular because the operator, when forming the channel, moves continuously along the slab, so that the spacing of the burner of the blow-torch and the slab surface varies. The channel depth is therefore not constant.

SUMMARY OF THE INVENTION

The object of the present invention is to provide a scarfing apparatus, which can be simple and cheap, for use in scarfing a regular inspection track, e.g. of uniform depth, in such a way that the quality of a slab of steel can be estimated in a reproducible manner.

The invention is set out in the claims.

The invention depends on the realisation that, for a satisfactory solution of the problem, the human factor must be removed. As mentioned above, scarfing machines are known for overall or partial scarfing of steel, but these machines are very expensive and are only usable profitably if there is a high throughput. When scarfing a channel for inspecting the quality of a slab of steel for rolling, one is concerned on the other hand with removing a very small part of the surface of the sheet. It is only necessary for example to form an inspection channel on a very small proportion of the products of a single charge of a continuous casting machine in order to establish the quality of the whole charge. Scarfing machines of the conventional type are therefore not profitable for forming tracks for the estimation of the quality of steel slabs, and for extensive technical reasons these machines are not suitable for this purpose.

In the apparatus of the present invention, a burner carriage carries one or more burners and which slides on at least one skid over the surface of the slab while being guided by a guide track spaced from the slab surface. The skid makes substantial contact pressure with the slab surface so that scale is pushed aside or crushed. In this way, the distance between burner(s) and slab surface can remain as constant as possible, with the advantage that the possibility of obtaining a scarfed track or channel of uniform depth is good. Consequently the quality of a slab of steel can be ascertained with more certainty. The apparatus can be of a reliable and simple type, so that it can be cheap and economic at the less intensive usage rate at which it is operated.

The possibility of obtaining a scarfed track of uniform depth can be improved when the carriage is provided on opposite sides of the location of the track with shields which, together with the slab surface during the scarfing of the track, form a channel, with the burner(s) having an orientation such that oxidised material is blown out of the scarfed track longitudinally along the said channel from the melt pool formed by the burner(s), so that spread of oxidised material over the surface of the slab is prevented by the shields. Preferably the shields provide the skid surfaces of the carriage.

Preferably there is a guide carriage supported by the said guide track and a connection between the guide carriage and the burner carriage which permits the latter to move towards and away from the slab surface. Suitably this connection is a bellows which can be operated to move the burner carriage away from the slab surface.

Preferably, the burner is rotatably mounted on the burner carriage, for rotation in the plane perpendicular to the slab surface and parallel to the inspection track, so that the burner can be operated in a first position in which the burner forms an initial molten puddle in the slab surface and in a second position in which the burner carriage moves across the slab surface while the burner forms the inspection track.

BRIEF DESCRIPTION OF THE DRAWINGS

The preferred embodiment of the invention will be described below by way of non-limitative example with reference to the accompanying drawings, in which.

DESCRIPTION OF THE PREFERRED EMBODIMENT

Figure 1:
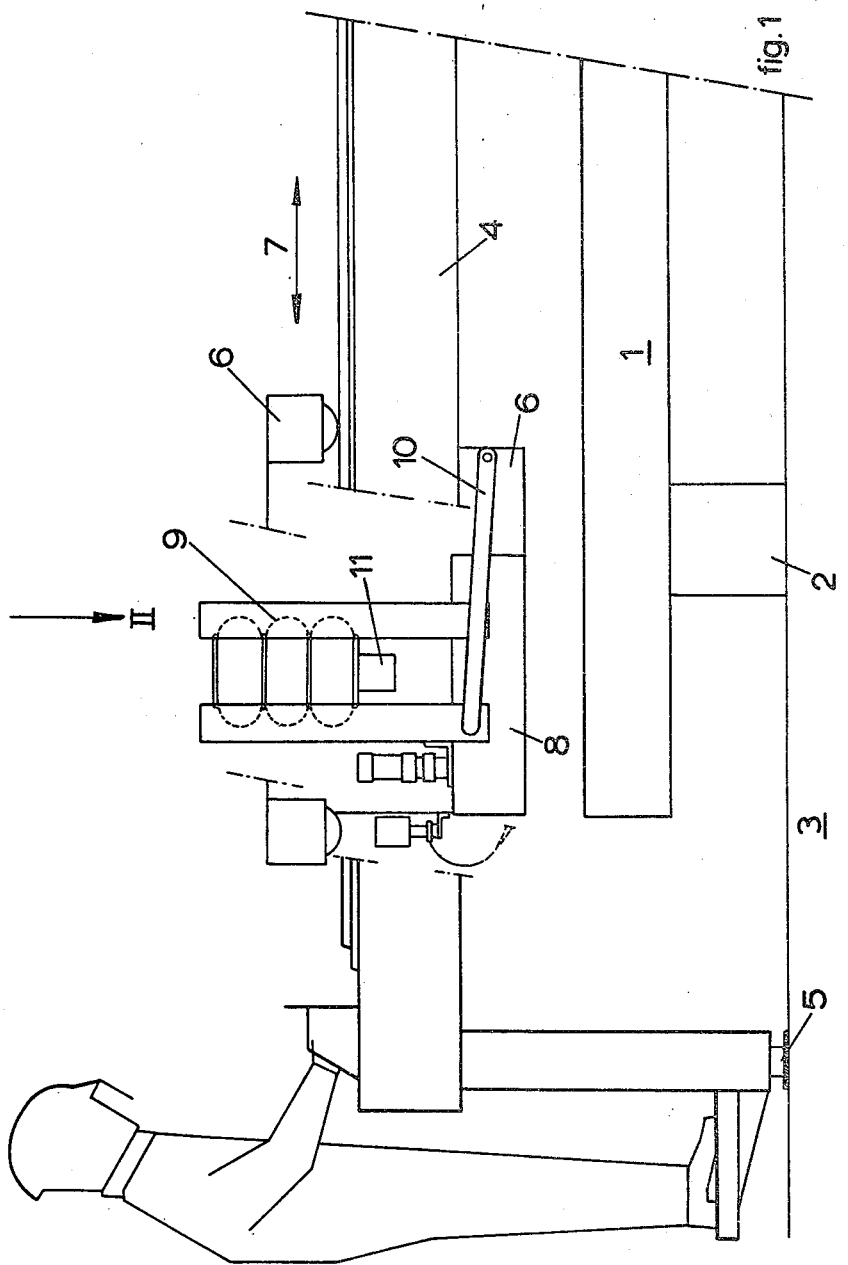
FIG. 1 is a side view of the scarfing apparatus embodying the invention, in the direction of the arrow I in FIG. 2.

FIG. 1 shows a horizontal slab 1 of ductile steel of deep drawing quality, supported by support columns 2 standing on the ground 3. A guide track 4 forming part of the scarfing apparatus can be moved perpendicularly to the plane of the drawing on schematically shown rails 5. A guide carriage 6 runs on the guide track 4 in the direction of the arrow 7.

The guide carriage (see also FIG. 2) is connected to a burner carriage 8 by a pneumatically operated bellows construction 9 and a rod 10. The lower end of the bellows 9 rests on a support 11 which is a part of the guide carriage 6 while the burner carriage 8 is suspended from the upper end of the bellows 9. Thus when high pressure air is supplied to the bellows the burner carriage 8 is lifted away from the slab and can be brought to any desired position with respect to the slab 1 by displacing the guide carriage 6 and/or the guide track 4 with respect to the slab. Means for effecting movement of the guide carriage 6 along the track 4 and of the track 4 on the rails 5 are not shown.

Lowering of the pressure in the bellows 9 lowers the burner carriage 8 onto the slab surface and the desired inspection track or channel can then be scarfed. For this, the burner carriage 8 is drawn over the slab surface by the guide carriage 6 through the rod 10.

The scarfing apparatus is connected to electric cables and hoses for combustible gas, oxygen and compressed air (not shown).

Figure 2:
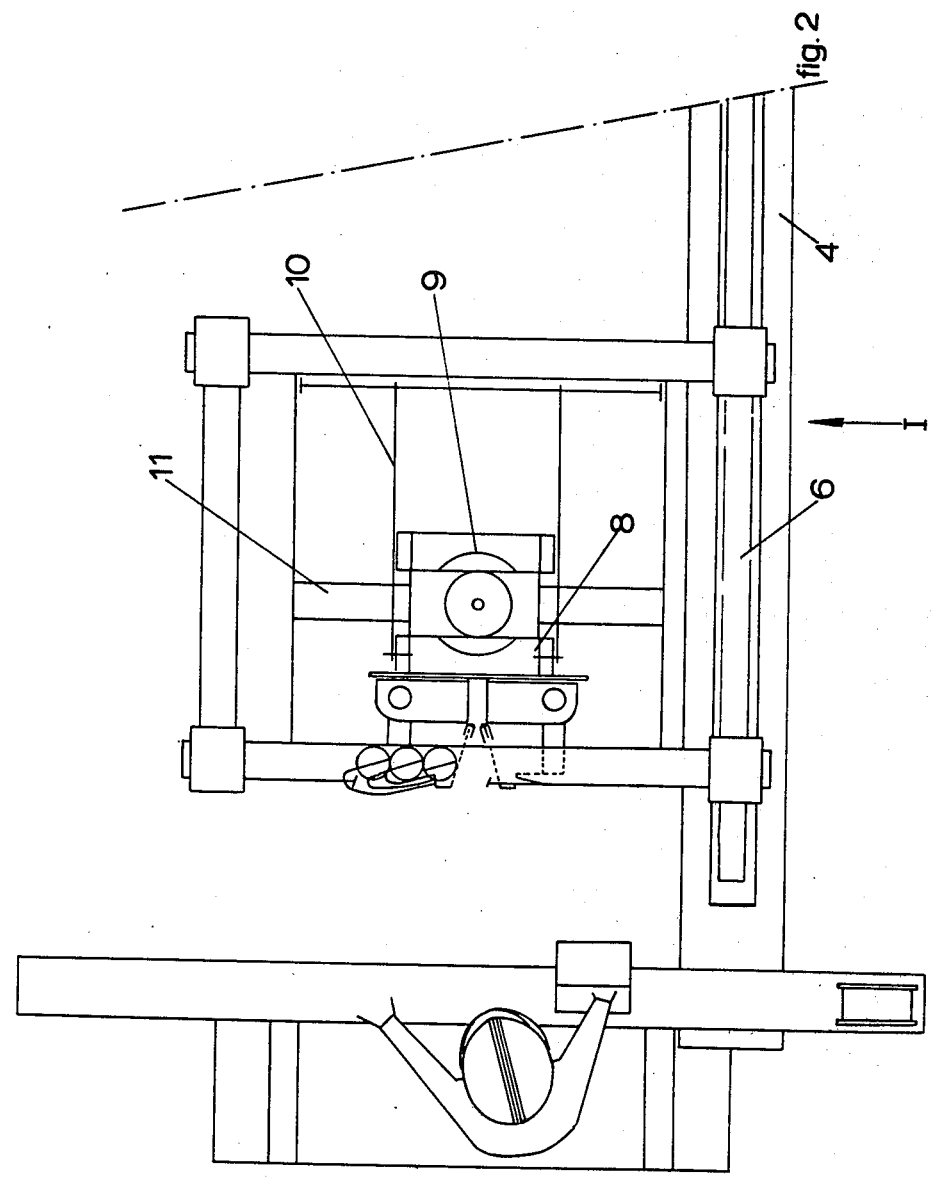
FIG. 2 is a top view of the apparatus in the direction of the arrow II in FIG. 1.

FIGS. 1 and 2 show that the guide track 4 has a portal structure extending over the slab 1, and also provides a stand and controls for the operator. FIG. 2 shows only one side of the track 4, for convenience.

Figure 3:
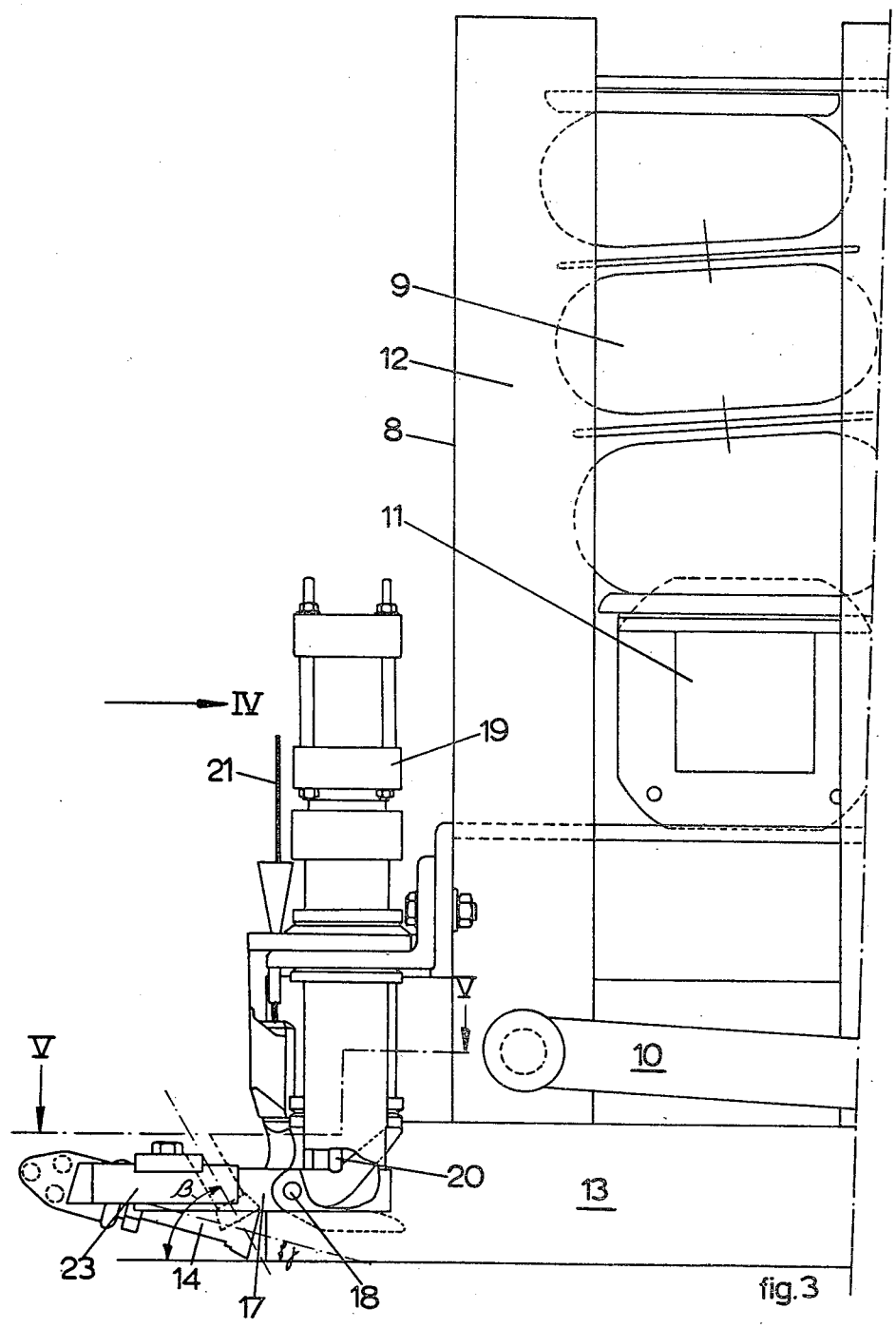
FIG. 3 is a side view of the burner carriage of the apparatus of FIG. 1, on a larger scale.
Figure 4:
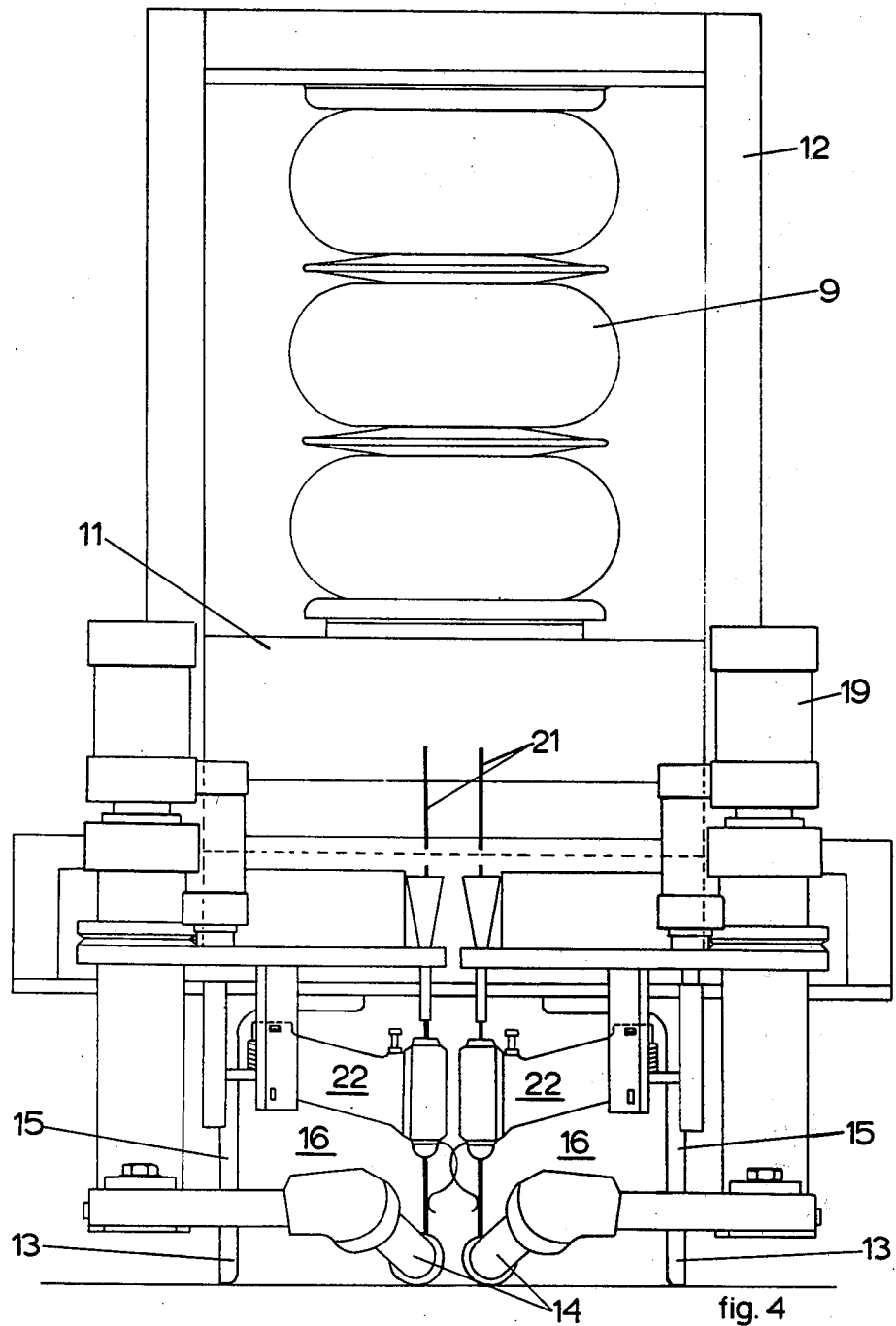
FIG. 4 is a side view of the burner carriage of FIG. 3 in the direction of the arrow IV of FIG. 3.

FIGS. 3 and 4 show that the burner carriage 8 has a frame 12 which is connected to the guide carriage 6 by the bellows 9 and the rod 10. The frame 12 is attached at its underside to two parallel skids 13, through which the burner carriage 8 rests on the slab surface during the process of forming the inspection track. The skids extend in the direction of movement of the guide carriage 6 on the guide track 4. FIG. 4 shows that the skids 13 are angle forms of unequal flange lengths, with the skid surface formed by the free edge of the longer flanges 12.

Figure 5:
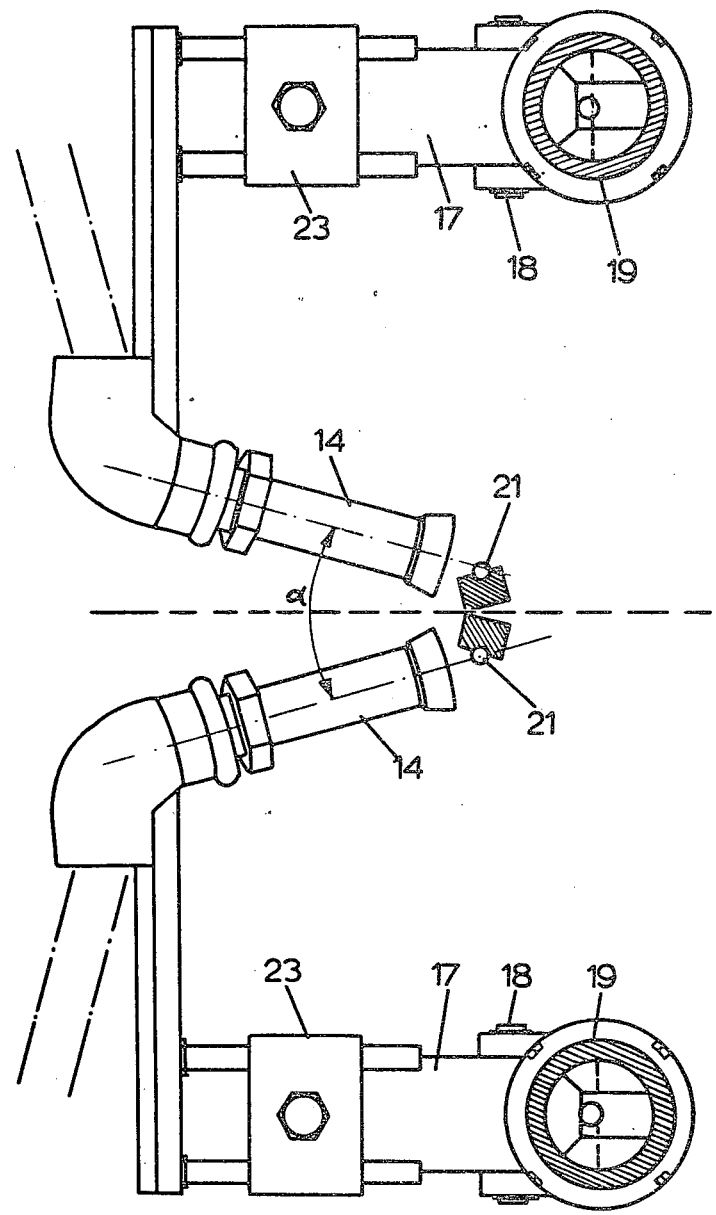
FIG. 5 is a cross-sectional view of the burner carriage along the line V—V of FIG. 3.

The burner carriage 8 carries two burners 14 whose axes are directed inwardly at an acute angle α to each other (see FIG. 5). The burners 14 are so oriented that the plane bisecting the angle α and perpendicular to the slab surface intersects the slab surface along a line which is generally parallel to the direction of movement of the burner carriage 8 across the surface. It is known from a similar burner arrangement in the U.S. Pat. Nos. 2,125,179 and 2,157,095 that the formation of material droplets at the sides of the scarfed channel is largely or wholly prevented by this arrangement. In addition during the scarfing of the channel, oxidised material is mainly blown out in front of the scarfed channel from the melt pool formed by the burners due to the momentum communicated by the flame jets.

Lateral spreading of oxidised material is also by the flanges 15 which act as shields on either side of the burners. These flanges form a channel or gutter 16 with the slab surface. In the embodiment shown, the skids 13 also form these shields, but they may alternatively be separate. The gutter 16 extends in front of the burners in the direction of movement of the burners during scarfing.

The burners 14 are preferably burners of the type with which it is possible to obtain a smooth scarfed channel, since this leads to high accuracy of estimation of the slab quality.

In order to be able to initiate the formation of the inspection track, either at the edge of the slab or on the slab surface away from the edge, without causing splits in the slab, a starting technique is used which is related to that disclosed in U.S. Pat. No. 3,966,503. In the present embodiment each burner 14 is connected to a lever 17 which is pivotally mounted on the burner carriage by a shaft 18. The lever 17 is moved between the two positions by a pneumatic cylinder 19 through a rod 20. In the position shown by broken lines in FIG. 3, the burner axis is at a relatively large angle β to the slab surface. In this position the melt pool is started with a pre-heat flame with the aid of a starter wire 21. The burner carriage has for this purpose a clamping device 22 to carry the wire for each burner.

In the position shown by full lines in FIG. 3, in which the burner axes make a small angle α with the plate surface and to which the burners are brought after the initiation of the scarfed channel, the melt pool is maintained by the pre-heating flame and an oxygen flame. The inspection channel is scarfed with the burners in this position.

Each burner can be adjusted to the correct position by means of an adjuster 23 and by rotation and height adjustment of the pneumatic cylinder 19.

While the inspection channel is being scarfed the skids of the burner carriage 8 make contact pressure with the slab equal to at least a part of the weight of the burner carriage, i.e. the frame 12, the bellows 9, the rod 10, the burners 14, the pneumatic cylinders 19, the starter wire devices 22 and other necessary pneumatic accessories and gas supply means, etc. Dirt and scale on the slab surface and any oxidised material which has spread out laterally over the slab surface from the scarfed channel is pushed aside by the skids 13 and/or crushed. In this way, the distance between the burners 14 and the slab surface is kept as constant as possible so that a scarfed inspection channel of uniform depth is obtained. It will be seen also that the skids 13 contact unscarfed regions of the slab surface (in this case regions laterally spaced from the location of the scarfed track, but the skid(s) might alternatively contact the slab surface in front of the region being scarfed). This means that a predetermined thickness of material can be accurately removed.

What is claimed is:

1. In apparatus for scarfing an inspection track on a flat surface of a steel slab, particularly a slab of ductile steel of deep-drawing quality, to enable sub-surface inspection of the slab, comprising at least one burner, the improvement that:

said burner is mounted on a burner carriage having at least one skid surface by which in use the carriage contacts the said surface of the slab at an unscarfed region thereof, the apparatus further having a guide track spaced from the slab surface and driving means to move the carriage with said skid surface making sliding contact with the slab surface while the carriage is guided by said guide track, the carriage being arranged so that said skid surface makes substantial contact pressure with the slab surface so that scale on the slab surface is pushed aside and/or crushed by the skid surface, whereby the burner is maintained at a substantially constant distance from the slab surface.

2. Apparatus according to claim 1 wherein the burner carriage has two said skid surfaces, located respectively on either side of the location of the inspection track formed by the burner.

3. Apparatus according to claim 1 wherein the burner carriage is provided with at least one shield on each side of the location of the inspection track formed by the burner, which shields, together with the slab surface during use of the apparatus, form a channel, the burner being oriented with respect to the slab surface so that oxidized material is blown out from the molten puddle formed by the burner mainly longitudinally along the channel and ahead of the puddle in the direction of movement of the burner carriage, so that the said shields control spreading of the oxidized material over the slab surface.

4. Apparatus according to claim 3 wherein the said shields provide the said skid surfaces of the burner carriage.

5. Apparatus according to one of claims 3 and 4 wherein said shields are at least partly located in front of the burner, in the direction of movement of the burner carriage over the slab.

6. Apparatus according to claim 1 including a guide carriage supported by said guide track and a connection between said guide carriage and said burner carriage which permits relative movement of the burner carriage relative to the track in the direction perpendicular to the slab surface.

7. Apparatus according to claim 6 wherein the said connection is a bellows connection which is operable to move the burner carriage out of contact with the surface of the slab.

8. Apparatus according to any one of claims 1, 3 and 6 wherein the burner is rotatably mounted on the burner carriage, for rotation in the plane perpendicular to the slab surface and parallel to the inspection track, so that the burner can be operated in a first position in which the burner forms an initial molten puddle in the slab surface and in a second position in which the burner carriage moves across the slab surface while the burner forms the inspection track.

9. Apparatus for scarfing an inspection track on a flat surface of a steel slab to enable sub-surface inspection of the slab, comprising
(a) a burner carriage,
(b) at least one burner mounted on said burner carriage,
(c) at least one skid surface on said burner carriage by which in operation the burner carriage slidingly bears against the surface of said slab at a region remote from the scarfed track with a substantial contact pressure,
(d) a guide track which in operation is spaced from the slab surface,
(e) driving means for moving the burner carriage across the slab surface with said skid surface bearing against the slab surface, while the carriage is guided by said guide track.

10. Method of scarfing an inspection track on a flat surface of a steel slab, particularly a slab of ductile steel of deep drawing quality, to enable sub-surface inspection of the slab, wherein a burner carriage supporting a burner is moved across the slab surface, the burner carriage having at least one skid surface making sliding contact with the slab surface at a region or regions away from the region which has been scarfed, the skid surface having substantial contact pressure against the slab surface so that scale on the slab surface is pushed aside and/or crushed by the skid surface, whereby the burner is maintained at a substantially constant distance from the slab surface.

* * * * *